(No Model.) 4 Sheets—Sheet 1.

J. R. ABBE.
TRIP HAMMER.

No. 302,811. Patented July 29, 1884.

FIG 4ᵃ   FIG 4

Witnesses
Bayard C. Ryder
Charles C. Hayes

Inventor
John R. Abbe
B. H. A. Seymour (No Model.) 4 Sheets—Sheet 2.
J. R. ABBE.
TRIP HAMMER.
No. 302,811. Patented July 29, 1884.
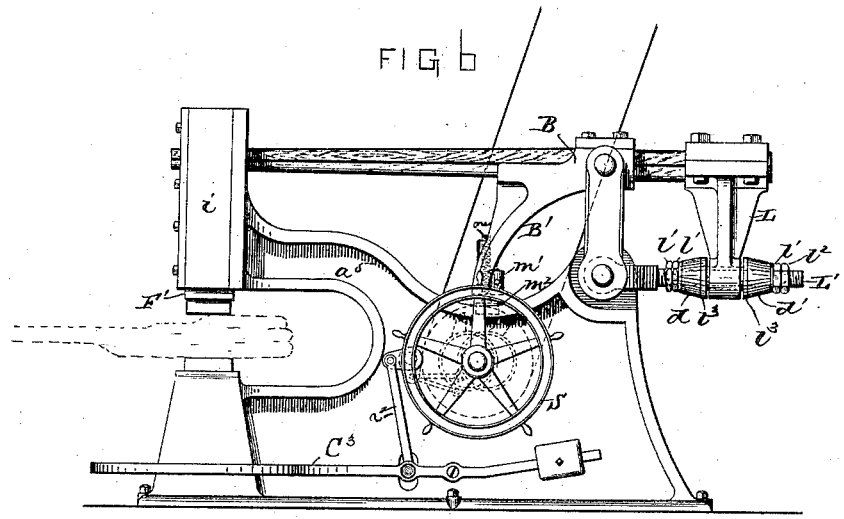
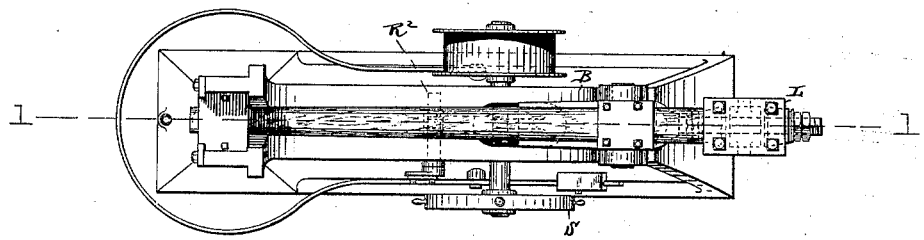
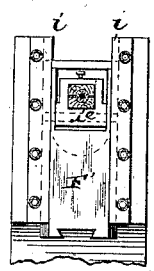
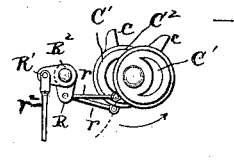
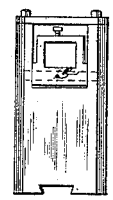
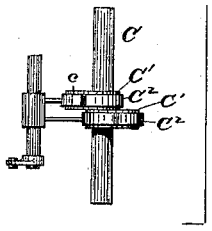
Witnesses
Bayard C. Ryder
Charles C. Hayes
Inventor
John R. Abbe (No Model.) 4 Sheets—Sheet 3.
J. R. ABBE.
TRIP HAMMER.
No. 302,811. Patented July 29, 1884.
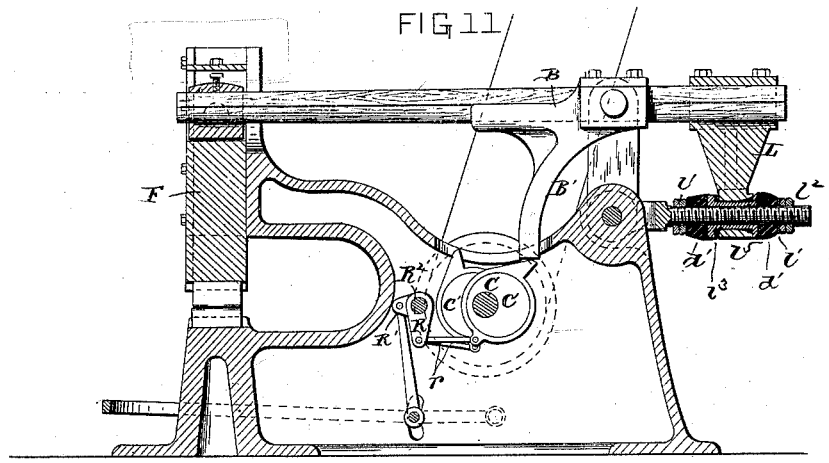
FIG. 11
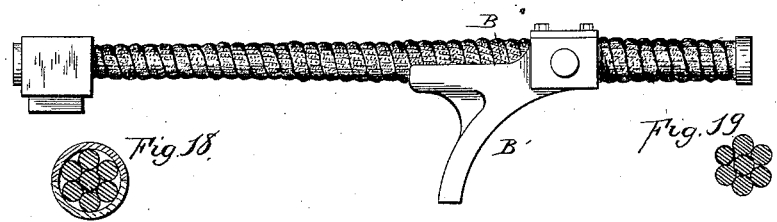
FIG. 12
Fig. 18.   Fig. 19.
FIG. 13
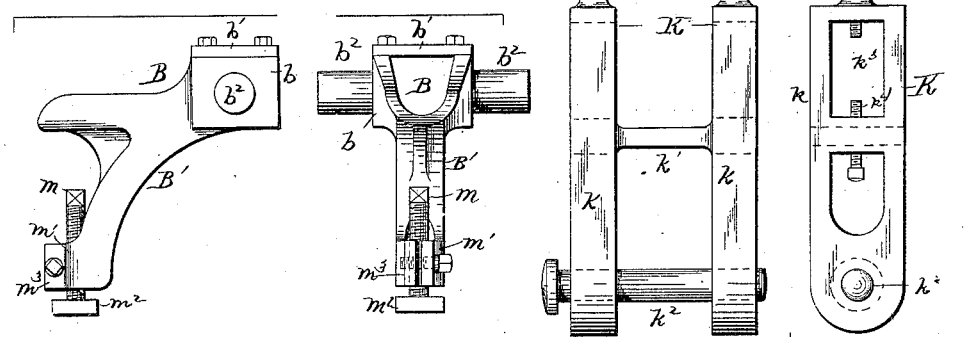
FIG. 14   FIG. 15
Witnesses
Geo. D. Pitts
C. W. Temple
FIG. 16
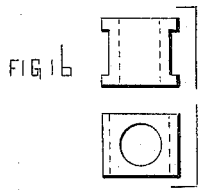
Inventor
John R. Abbe,
By H. A. Surmon (No Model.)

J. R. ABBE.
TRIP HAMMER.

No. 302,811.

4 Sheets—Sheet 4.

Patented July 29, 1884.

Witnesses
Geo. F. Downing.
S. G. Nottingham

Inventor.
John R. Abbe.
By H. A. Seymour

UNITED STATES PATENT OFFICE.

JOHN R. ABBE, OF MANCHESTER, NEW HAMPSHIRE.

TRIP-HAMMER.

SPECIFICATION forming part of Letters Patent No. 302,811, dated July 29, 1884.

Application filed August 6, 1883. (No model.)

*To all whom it may concern:*

Be it known that I, JOHN R. ABBE, of Manchester, in the county of Hillsborough and State of New Hampshire, have invented certain new and useful Improvements in Trip-Hammers; and I do hereby declare the following to be a full, clear, and exact description of the invention, such as will enable others skilled in the art to which it appertains to make and use the same.

My invention relates to trip-hammers which deliver their blows by gravity; and the objects of the improvement are to enable a hammer of this class to be worked either by hand or power; to provide such a hammer with a strong, durable, and elastic helve; to enable the force of the blow to be readily regulated at will; to enable the hammer to be readily thrown out of action; to automatically re-enforce the blow; to cushion the same as desired, and to generally enhance the efficiency and attain simplicity and economy of construction in this class of machines.

With these objects in view the invention consists in certain novel constructions and combinations of devices, which will be fully understood from the following particular description in connection with the accompanying drawings, in which—

Figure 1:
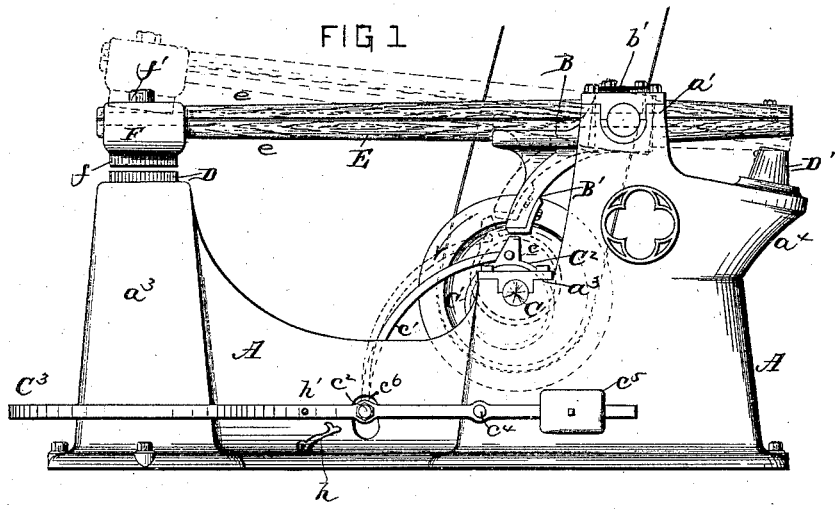
Figure 2:
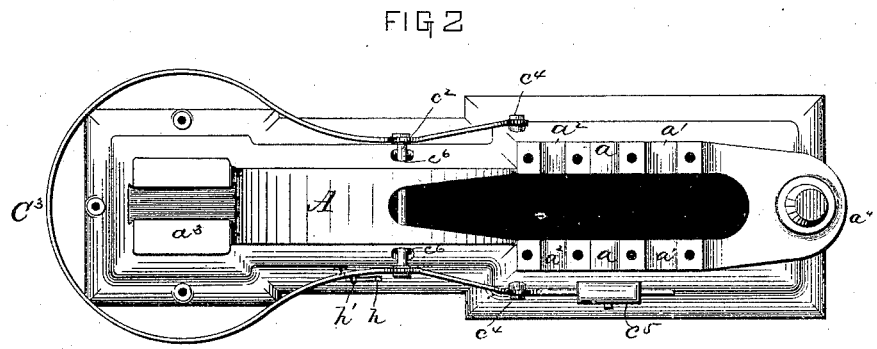
Figure 3:
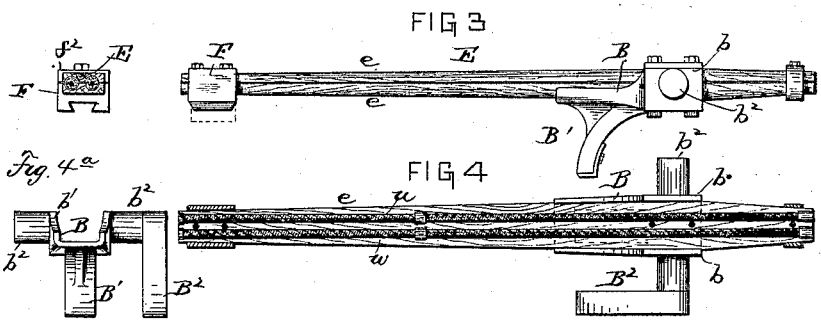
Figure 5:
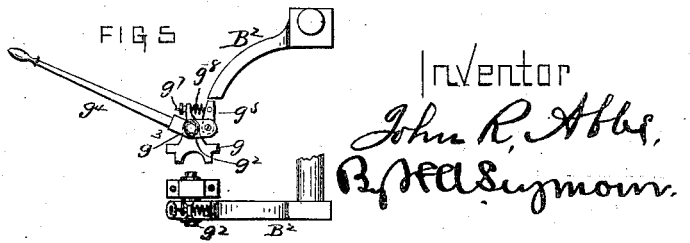
Figure 17:
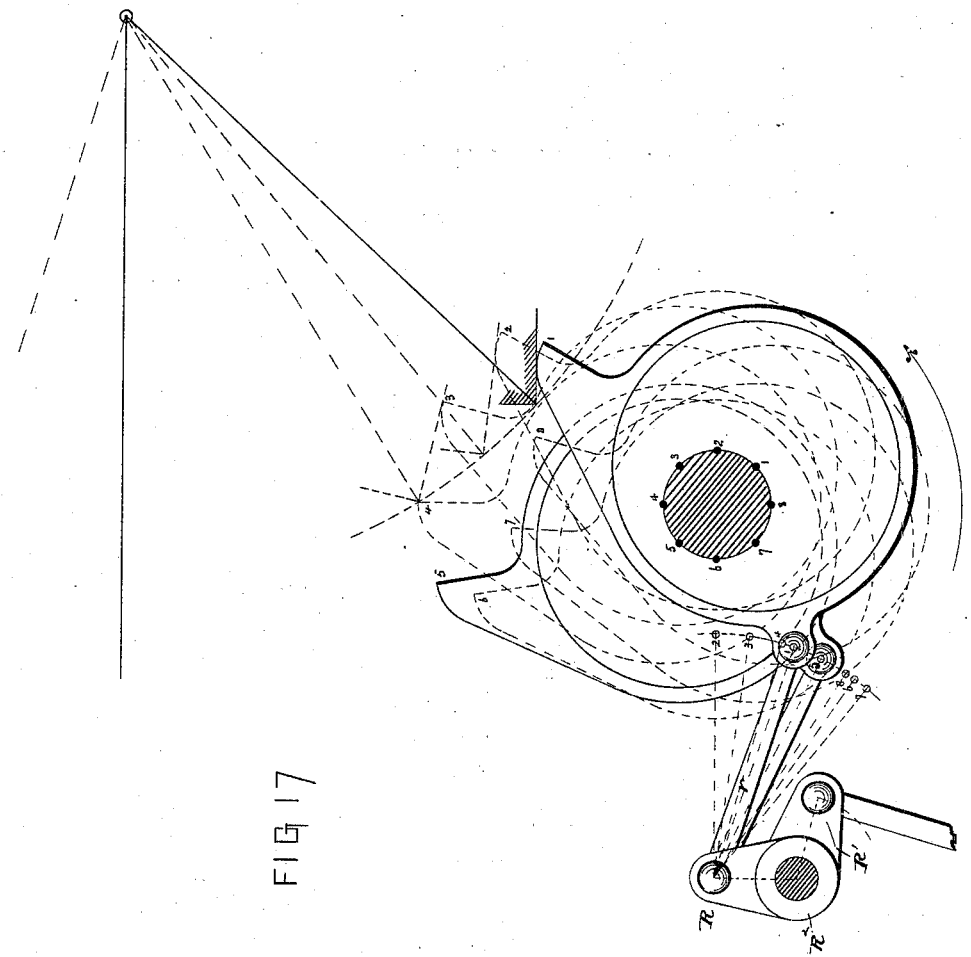

Figure 1 is a side elevation of a trip-hammer comprising portions of my improvements. Fig. 2 is a plan view of the bed-casting, with the treadle in place, but the hammer and other parts removed. Fig. 3 is a side elevation of the hammer, with its trunnions and lifting-toe, for power operation, and showing also a front view of hammer-head. Fig. 4 is a plan view of the hammer, with the upper portion of the helve and the caps of the hammer and of the helve-holder removed, the view showing also a supplementary toe for use in hand operation of the hammer. Fig. 4ⁿ is a front elevation of the helve-holder, with its attached trunnions and toes, for power and hand operation. Fig. 5 is a side elevation and plan view of parts illustrating mechanism for use in operating the hammer by hand. Fig. 6 is a side elevation of a trip-hammer of modified construction. Fig. 7 is a plan view of the same. Fig. 8 is a front view of the guides, the hammer-head, and the end of a helve as attached to the head. Fig. 9 is a detached view of the hammer-head. Fig. 10 is a side elevation and plan view of the eccentrics and connections. Fig. 11 is a view, partly in elevation and partly in section, of a trip-hammer, mainly like that shown in Fig. 6, the plane of section being indicated by the line 1 1 in said figure. Fig. 12 is a side elevation of a modified construction of helve, with hammer-head, helve-holder, and toe attached. Fig. 13 is a longitudinal section of the modified helve on one side of its core. Fig. 14 shows side and front elevations of a helve-holder provided with an adjustable toe. Fig. 15 shows side and front elevations of the helve-supporting link. Fig. 16 gives top and side views of the adjustable trunnion-bearings detached. Fig. 17 is a diagram illustrating the action of the eccentrics. Fig. 18 is a sectional view of a helve composed of wire incased in wood, and Fig. 19 is a similar view of a helve composed wholly of wire.

Referring to Fig. 1, the letter A designates the bed-casting, which supports the other parts of a trip-hammer, said bed-casting having side walls, $a\ a$, with upward projections $a'\ a'$, in which is mounted the helve-holder B and steps $a^2\ a^2$, in which are arranged the bearings of the driving-shaft C. It has also an elevated front portion, $a^3$, which supports an anvil, D, and a rearward projection, $a^4$, which carries a cushion, D', for the rear end of the helve. E is the helve, and F the hammer-head secured thereto. The hammer-head may simply have an opening or eye to receive the end of the helve, which may be clamped therein by a single clamp-screw, $f'$, as shown in Fig. 1; or the head may have an open socket to receive the helve and be provided with a cap, $f^2$, which embraces the top of the helve, and is secured to the lower portion of the head by screws, which pass through both the cap and the helve, as shown in Fig. 3.

The helve is composed of one or more lengths of stout steel-wire rope, $w\ w$, in the present instance inclosed in a wooden casing formed of two parts, $e\ e$, laid together and grooved on their inner surfaces to receive the rope or ropes, as shown in Fig. 4. In this figure I have shown two ropes, though only one or more than two may be used, as desired. In using a single rope I prefer to select one of much larger size than such as are used in plurality. In constructing the helve I cut the rope to the required length and bind it tightly with wire at the ends and about the middle, to prevent the strands from becoming loose. The two parts $e\ e$ of the wooden casing are preferably formed of a strong, well-seasoned, elastic wood—such as oak, ash, or hickory—and each is grooved longitudinally on its inner surface to a depth equal to half the diameter of the rope, so that when the ropes are laid in the grooves of one part the other part may be placed upon it and receive half the thickness of the ropes in its grooves. The two wooden parts are then secured together by a metal band at the rear end of the helve; the front end is introduced into the eye of the hammer-head, and a portion of the helve to the rear of its middle is secured in the helve-holder, which is to be so placed that its trunnions will project at about one-fourth its length from the rear end of the helve, at which point the helve in the present instance has its largest diameter, the casing tapering both ways therefrom.

Instead of making the elastic helves of lengths of wire rope incased in a wooden envelope, as shown in Figs. 4 and 18, or winding the wire rope around a rigid core, as shown in Fig. 13, they can be made wholly of wire without the casing or core.

The helve-holder B is a trough-like casting, shaped to fit the under side of the helve, and having the rear portion of side walls, as at $b\ b$, extended to receive a cap-plate, $b'$, which is bolted to their edges, and fits snugly upon the upper side of the helve, thus securing it firmly in the holder. Trunnions $b^2\ b^2$ project from the extended side walls, $b\ b$, of the holder, and are fitted to bearings arranged in ordinary manner in the projecting portions $a'\ a'$ of the side walls of the bed-casting. From the under side of the helve-holder a toe, $B'$, curves forward and downward when the helve is in position, as shown, and it is upon the lower end of this toe that the tappets strike which lift the helve and hammer.

Upon the shaft C, which has its bearings in the steps $a^2\ a^2$ of the bed-casting, is secured an eccentric, $C'$, (shown partly in dotted lines,) and upon this eccentric is a strap, $C^2$, from which a tappet, $c$, projects upward, and is connected by a curved link, $c'$, with a cross-bar, $c^2$, of a loop-shaped treadle, $C^3$, which extends around the front end of the bed-casting, and has its arms pivoted on pins $c^4$, projecting from said casting, one of said arms being extended rearwardly, and provided with a counterweight, $c^5$, which causes the front portion of the treadle to stand normally elevated, its upward motion being limited by the upper end walls of slots $c^6\ c^6$ in the side walls of the bed-casting, through which the cross-bar $c^2$ extends. On the end of the shaft C which projects on the side of the bed-casting opposite that shown in the drawings is fixed a belt-wheel, $C^4$, which may be connected by belting in the usual manner with a motor. When rotary motion in the direction indicated by the arrow is imparted to the shaft C and its eccentric, the tappet $c$ on the eccentric-strap will be first carried upward against the toe B, elevating the forward part of the helve and the hammer, and will be then carried forward from under the toe, as indicated in dotted lines, and permit the hammer to fall, the farther movement of the eccentric carrying the tappet downward and rearward to repeat its action on the toe. If the treadle $C^3$ should be depressed to the limit of its downward movement, the strap $C^2$ would be moved around forwardly on the eccentric to such position that the tappet would stand in front of the toe when the eccentric is at its extreme downward throw, and would consequently rise in front and clear of the toe when the eccentric moves through its upward throw. Thus the attendant of the machine may at any time, by means of the treadle, throw the hammer out of operation, even though the driving-shaft C continues to revolve. This is a feature of much importance, as the attendant may with his foot control the hammer while his hands are engaged in managing the metal being operated upon. When it is desired to cease work at the hammer temporarily, the treadle may be held down by a hook, $h$, which can be engaged with a pin, $h'$, projecting from one of the treadle-arms.

Upon the projection $a^4$ of the bed-casting is arranged a stout rubber cushion, $D'$, in position to be struck and compressed by the rear end of the helve E each time it descends, and when the toe $B'$ is released by the tappet, the resilience of this cushion considerably reenforces the blow of the hammer.

In order to adapt such a hammer, as shown in Fig. 1, for operation by hand as well as by power, I secure to one of the trunnions of the helve-holder a supplementary toe, $B^2$, which will stand outside of the bearing in which said trunnion is mounted, and the flat-topped bearing-cap of the shaft C, as shown in Fig. 1, I replace by a cap, $g$, such as shown in Fig. 5. This cap $g$ has an upward projection, $g'$, from which projects outwardly a pin, $g^2$, upon which is pivoted a short elbow, $g^3$, provided at one end with a socket to receive a hand-lever, $g^4$, and having pivoted to its rear end an upwardly-projecting tappet, $g^5$. From the bend of the elbow $g^2$ a lug, $g^5$, projects upwardly, and through it passes loosely a short stem, $g^7$, having its rear end pivoted to the swinging tappet $g^5$, and its front end provided with an adjusting-nut in the front of the lug. Around the stem is arranged a helical spring, $g^8$, one end of which bears against the lug and the other against the tappet, so as to force said tappet rearwardly, but allow it to swing forwardly under pressure. By raising the hand-lever $g^4$ somewhat above the position, as shown, the tappet $g^5$ will be brought under the toe $B^2$, first striking the front edge of said toe and yielding forward until it slips under the end thereof, and is forced backward by the spring.

Then, when the lever is depressed, the tappet will force the toe and the hammer end of the helve upward, and then escape forwardly from under the toe and allow the hammer to fall. This operation may be continued at any speed or intervals, as desired, and in the meantime the devices for operating the hammer by power are supposed to be rendered inoperative by holding down the treadle, as before explained. When the power devices are to be used, the lever can be removed from its socket and the elbow swung down out of the way of the toe. In small establishments or shops where power is not used the eccentrics and their connections may be dispensed with altogether. The main strength and elasticity of the helve lies in the steel-wire rope or ropes, which, for a hammer of medium size, should have a diameter of from two and one-half to three and one-half inches. Each wire bears an individual strain varying with respect to the other wires according to the flexure of the helve, and the combined strength and spring of all the wires give to the helve an efficiency and durability far beyond that of helves depending upon flat springs, such as heretofore used. Wire-rope helves may be applied with advantage to hammers, axes, and similar tools.

In the modified machine illustrated in Figs. 6, 7, 8, 9, 10, and 11 are embodied some features of my invention not heretofore described. In this machine the hammer-head F, instead of swinging in the arc of a circle, moves in vertical guides $i$ $i$, secured to an arm, $a^5$, of the bed-casting, which is of a different shape from that shown in Fig. 1, and, in order to conform to this movement of the hammer-head, the front end of the helve is inserted in a swiveling socket-piece, $i^2$, arranged in a recess in the top of the hammer-head, and the helve-holder trunnions have their bearings in the top of a stout link, K, the lower end of which is pivoted to the bed-casting. By this contrivance the helve-holder is permitted to swing bodily in the arc of a circle besides turning on its trunnions, and thus in turn permits the hammer-head to have a vertical rectilinear movement, so that it always strikes a square blow upon the metal being worked, no matter what its dimensions, provided it can be placed between the anvil and hammer.

In the rear end of the helve (in Fig. 6) is secured a very strong downwardly-projecting arm, L, the lower end of which is terminated by a collar, $l$. Through this collar extends loosely a screw-threaded arm, L', having its inner end pivoted on the pin which holds the lower end of link K. Upon the screw-arm L', on opposite sides of the collar $l$, are arranged adjusting and check nuts, as at $l'$ $l^2$, and between the adjusting-nuts $l^2$ and said collar are stout rubber cushions $d$ $d'$, which loosely surround the arm L', and have their faces next the collar $l$ protected by metal washers $l^3$. The cushions $d$ $d'$ may be adjusted as desired, and according to the action they are desired to have. When the forward part of the helve swings upward and the rear end descends, the collar $l$ will be caused to compress the inner cushion, $d$, and when the helve is released, the resilient force of the cushion $d$ is added to the force of gravity, which causes the hammer-head to fall, thus greatly re-enforcing the blow, and this re-enforcement may obviously be regulated by adjusting the collar. The collar $d'$ serves to cushion the blow and give the hammer a tendency to rebound after its first force of impact is expended, thus materially facilitating the lifting of the hammer when operated by hand.

The cushion devices shown in Fig. 11 are the same as in Fig. 6, except that the lower end of arm L is bifurcated, instead of being provided with a collar, and embraces a metal spool, $l^5$, which slides upon the arm L, its heads striking the cushion $d$ and $d'$ alternately as the helve vibrates.

Reverting to Fig. 6, it will be seen that the lower end of toe B' is provided with a screw-sleeve, $m'$, in which is arranged vertically a screw, $m$, the lower end of which has a broad flat head, $m^2$. (Shown in dotted lines.) The tappet or tappets of the eccentric-straps work against this screw-head, the screw being in effect an adjustable extension of the toe B', by which the range of movement of the hammer and the force of its blow may be regulated. A more clear illustration of the toe provided with the adjustable screw is given in Fig. 14. In this figure the sleeve $m'$, which embraces the screw, projects forward instead of rearward, and its wall is slitted on one side and provided with lips $m^3$, through which passes a screw for tightening or loosening the sleeve upon the screw. It is to be loosened when the adjustment of the screw is to be changed, and tightened afterward to hold it to its adjustment.

In Figs. 6 and 11 the driving-shaft C is provided with two eccentrics, C' C', each provided with a tappeted strap the same as the eccentric heretofore described; but when the two eccentrics are used they are differently arranged as regards their throw, so that the tappets will act successively upon the toe B' and give the hammer two strokes to each revolution of the shaft C. The relative arrangement of the eccentrics is illustrated clearly in the detail views of Fig. 10. When the two eccentrics are used, the toe B' may be provided with two adjustable extension-screws—one for each tappet—and said screws may be differently adjusted, so that the two tappets will raise the helve to different heights, and one of the hammer blows will be lighter than the other. This may be useful in some kinds of forging—as, for instance, in forming oblong pieces. On opposite sides from their tappets the eccentric-straps are provided with ears, which are connected by links $r$ $r$ with one arm, R, which projects from a rock-shaft, $B^2$, having its bearings in the walls of the bed-casting. From this shaft projects another arm, R', at right angles to arm R, and connected by a link, r², with the cross-bar of treadle C³. It will be seen that when the treadle is depressed its full stroke, the eccentric-straps will be so shifted as to throw their tappets forward of the toe B' in the same manner as heretofore described, and consequently they will not strike the toe as the eccentrics revolve. It will be further seen that by depressing the treadle only partially the tappets will be carried only so far forward that they will lift the toe to give the hammer less than its full stroke, so that the attendant may regulate the force of the blows with his foot while he is manipulating the metal being operated upon.

In Figs. 6 and 7 the shaft C is shown as provided with both a belt-wheel and a hand-wheel, S, so that the hammer may be worked by either power or hand, as desired.

In the diagram Fig. 17 is illustrated the action of the eccentrics at work. When the straps are arranged upon the eccentrics, as shown in full lines, the toe is given its full strike, each tappet rising rapidly from the position indicated by the numeral 1 to those indicated in dotted lines at 2 and 3, and then moving forward to 4, when it passes from under the toe. As the toe falls the upper tappet assumes the position indicated in full lines at 5 just as the other tappet (which has passed from the same position) takes its place at 1 under the toe. Each tappet passes from 5 to 6, 7, and 8 on its path to resume the position under the toe, the corresponding movements of the connected parts being indicated by the same numerals. It will be understood that the end of the toe is broad enough for both tappets to strike.

I have shown the link R in Figs. 6 and 11 with non-adjustable bearings for the trunnions of the helve-holder; but I prefer to construct this link as shown in Fig. 15, it being a double-armed link, the two arms k k being connected by a cross-bar, k', the lower ends arranged on each side of a lug of the bed-casting and pivoted on a pin, k². The upper portion of each arm has an oblong opening, k³, in which is to play an adjustable bearing-box, such as shown in elevation and plan in Fig. 16, these boxes being held in place by adjusting screws above and below, as shown at k⁴ k⁴, Fig. 15. With bearings thus arranged the hammer-helve may be adjusted to work with great nicety.

In Figs. 12 and 13 I have shown a modified construction of the helve, the rope w', forming the helve E', being twisted upon a form or core, E², to give it a tapering form in both directions from a point of greatest diameter, at which will be located its fulcrum. The core may be made of metal, wood, or any other material possessing sufficient strength and elasticity to enable it to conform to the slight flexures of the helve when in use and resume its straight axis. Such a helve may be made of any desired size, and may be used either with or without an outer casing of wood. I may omit the core and use the rope straight, but prefer to use the core to attain the bulged form.

Having now fully described my invention, and explained the operation thereof, I wish it to be understood that I do not confine myself to the precise details of construction shown in my drawings, but reserve to myself the right to vary the same in any manner for the more efficient carrying out of the objects of the improvement without departing from the essential principles and true scope thereof. For instance, I may use the ordinary wood helve with the other parts, though the wire helve is preferable, and can be made shorter, so that the machine will occupy less floor than if a wood helve and flat spring were used.

Having fully described my invention, what I claim as new, and desire to secure by Letters Patent, is—

1. An elastic helve for trip-hammers, composed wholly or in part of wire rope, substantially as set forth.

2. An elastic helve for trip-hammers, formed of one or more lengths of wire rope twisted upon a core, substantially as set forth.

3. An elastic helve for trip-hammers, formed of one or more lengths of wire rope incased in wood, substantially as set forth.

4. The combination, with the hammer-helve and its projecting toe, of an eccentric or eccentrics, suitably mounted, and provided with adjustable straps having tappets arranged to successively lift and release said toe, substantially as and for the purpose set forth.

5. The combination, with the eccentrics, one or more, and the tappet strap or straps, of the treadle, and devices connecting it with said strap or straps, substantially as and for the purpose set forth.

6. The combination, with the helve having the projecting toe and the driving-shaft having an eccentric fixed thereon, of an adjustable strap arranged upon said eccentric, and provided with a tappet for lifting and releasing the toe, of the treadle and link connecting the same with said strap, and means for holding the treadle up, substantially as set forth.

7. The combination, with the helve and means for operating the same, of the pivoted link supporting said helve, substantially as described.

8. The combination, with the helve, and the hammer-head connected thereto, and arranged to have a rectilinear movement, of the pivoted link supporting the helve, and means for vibrating said helve, substantially as described.

9. The combination, with the intermediately-pivoted helve and means for raising and releasing the same, of an arm projecting laterally from its rear end, a pivoted arm passing loosely through the end of said projecting arm, and the resilient cushion or cushions carried by said pivoted arm on one or both sides of the end of said projecting arm, substantially as and for the purpose set forth.

10. The combination, with the hammer-helve having a main toe and a supplementary toe, of the main tappets on the eccentric-straps, and the supplementary tappets, and the mechanism to shift the tappets at will, so that the main toe may co-operate with the main tappets, or the supplementary toe with the supplementary tappets, interchangeably or alternately, or otherwise.

11. The trip-hammer helve having a toe adjustable in length, substantially as described.

12. The combination, with a toe projecting from the hammer-helve, and provided with a threaded sleeve, of the adjustable screw arranged in said sleeve, and provided with a head to receive the action of the helve-lifting devices, substantially as described.

13. The combination, with the helve, its holder, and the pivoted link supporting said holder, of the adjustable bearing-boxes supported by the link and receiving the trunnions of the helve-holder, substantially as described.

14. The pivoted link provided with adjustable bearing-boxes, substantially as and for the purpose set forth.

In testimony whereof I have signed this specification in the presence of two subscribing witnesses.

JOHN R. ABBE.

Witnesses:
EDWARD W. PILLSBURY,
ENOCH B. AIKEN.